US008835821B2

(12) United States Patent
Zeijlon

(10) Patent No.: US 8,835,821 B2
(45) Date of Patent: Sep. 16, 2014

(54) MICROWAVE OVEN WITH ONE-TOUCH BUTTON USER INTERFACE

(75) Inventor: Anders Zeijlon, Norrkoping (SE)

(73) Assignee: Whirlpool Corporation, Benton Harbor, MI (US)

( * ) Notice: Subject to any disclaimer, the term of this patent is extended or adjusted under 35 U.S.C. 154(b) by 1721 days.

(21) Appl. No.: 12/046,692

(22) Filed: Mar. 12, 2008

(65) Prior Publication Data

US 2008/0223854 A1 Sep. 18, 2008

(30) Foreign Application Priority Data

Mar. 13, 2007 (EP) .................................... 07104060

(51) Int. Cl.
*H05B 6/50* (2006.01)
*H05B 6/68* (2006.01)
*A21B 1/00* (2006.01)
*H05B 6/64* (2006.01)

(52) U.S. Cl.
CPC ............ *H05B 6/6438* (2013.01); *H05B 6/6435* (2013.01)
USPC .............................. 219/704; 219/714; 99/327

(58) Field of Classification Search
CPC ............................ H05B 6/6438; H05B 6/6435
USPC ......... 219/704, 489, 702, 720, 506, 710, 719, 219/492, 508, 486, 490, 491, 493, 499, 219/510; 99/325–335, 348, 467, 483, 484, 99/486, 451; 366/69, 96–98, 144–146, 366/149, 314, 341, 601; 426/504, 512, 523, 426/243
See application file for complete search history.

(56) References Cited

U.S. PATENT DOCUMENTS

| | | | | | |
|---|---|---|---|---|---|
| 4,339,646 | A * | 7/1982 | Doi et al. | | 219/714 |
| 4,370,545 | A | 1/1983 | Hotta et al. | | |
| 4,375,586 | A * | 3/1983 | Ueda | | 219/714 |
| 4,418,262 | A | 11/1983 | Noda | | |
| 4,968,864 | A | 11/1990 | Doi et al. | | |
| 5,967,021 | A * | 10/1999 | Yung | | 99/327 |
| 6,847,535 | B2 * | 1/2005 | Gilton et al. | | 365/51 |
| 6,903,318 | B2 | 6/2005 | Thorneywork | | |
| 2003/0095034 | A1 * | 5/2003 | Clothier | | 340/10.1 |
| 2004/0060932 | A1 | 4/2004 | Chun | | |
| 2005/0146434 | A1 * | 7/2005 | Gaiotto et al. | | 340/568.2 |

FOREIGN PATENT DOCUMENTS

| | | |
|---|---|---|
| DE | 9400564 | 3/1994 |
| EP | 0550124 A2 | 7/1993 |
| EP | 1193584 A1 | 4/2002 |

* cited by examiner

*Primary Examiner* — Quang Van

(57) ABSTRACT

A cooking oven, particularly a microwave oven, provides for detecting food data and for adjusting food heating and/or cooking process. The oven particularly includes an user interface with at least one socket-shaped seat adapted to receive a removable plug-shaped button which stores the food data and which is adapted to be pressed by the user for starting the heating and/or cooking process or for programming such heating or cooking.

20 Claims, 2 Drawing Sheets

MICROWAVE OVEN WITH ONE-TOUCH BUTTON USER INTERFACE

BACKGROUND OF THE INVENTION

1. Field of the Invention

The present invention relates to a cooking oven, particularly a microwave oven, comprising means for detecting food data and for adjusting food heating and/or cooking process accordingly.

2. Description of the Related Art

This kind of ovens is known from EP-A-550124 and EP-A-1193584. According to EP-A-550124, a microwave oven is provided with a bar code reader for inputting food data printed on a packaged food product. Once the user has put the food near the code reader, he can memorize the food data (for instance a cooking recipe associated with the food) in the control process unit of the oven and he can also modify it by using a keyboard or the like. Independently on the presence or absence of stored recipes in the control process unit of the oven, the user has to select certain parameters of the oven (power, time, function, sequences etc.) or to select a certain recipe and then he has to press the start button. Therefore this known oven needs a quite high degree of interaction between the oven and the user, with several sequential steps (scanning of bar code on the food package or on a book reporting the codes, selecting a stored recipe, pressing the start button) which can be too complex, particularly for children or for elderly people.

The same problem does exist for the microwave oven shown in EP-A-1193584 where the food data are automatically transmitted to the central process unit of the oven by using a remotely accessible data media associated with the food. Also in this case the user has to select through the user interface the appropriate recipe automatically stored, to modify such recipe according to his needs or to start a normal heating/cooking process (by-passing the stored recipes) by pressing a start button.

SUMMARY OF THE INVENTION

An object of the present invention is to avoid the above drawbacks and to provide an oven that is very simple to be used either by children of by elderly people who have limited experience with complex user interfaces.

The above object is reached thanks to the features listed in the appended claims.

One of the most important features of the oven according to the invention is the use of removable one-touch buttons which may be inserted in corresponding seats of the user interface of the oven and which contain a solid state memory or equivalent means for storing food data. The user has only to press such button for starting an appropriate heating and/or cooking process, without any need of choosing a recipe in a menu or to do anything more than simply pressing a button.

Each button, that can be sold with a food package or with the oven itself, is provided with an image of the food associated with the data and/or cooking recipe stored in the memory of the button, so that the oven can be used also by children that are not yet able to read.

BRIEF DESCRIPTION OF THE DRAWINGS

The invention will be better appreciated from the following description given solely by way of non-limiting example and with reference to the accompanying drawings in which.

DETAILED DESCRIPTION OF THE PREFERRED EMBODIMENTS

Figure 1:
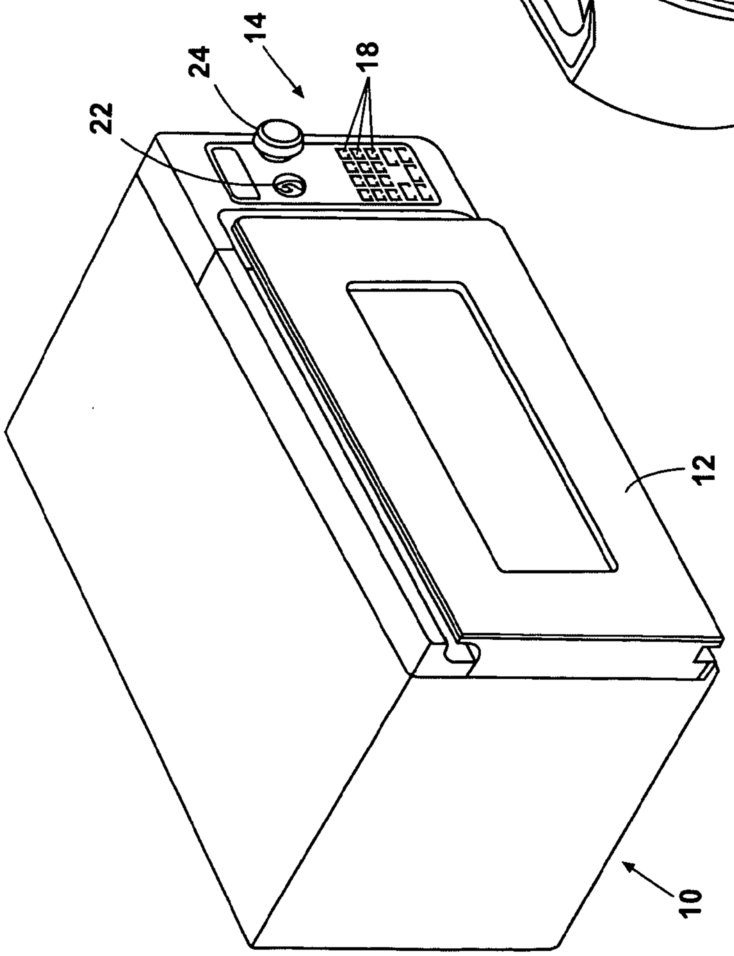
FIG. 1 shown a perspective view of a microwave oven according to the invention.
Figure 2:
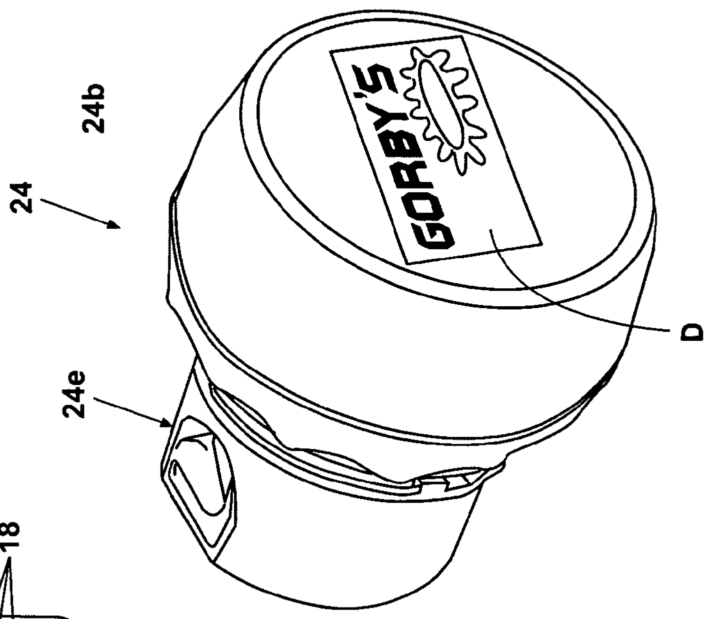
FIG. 2 is a view of a removable button used in the oven of FIG. 1.
Figure 3:
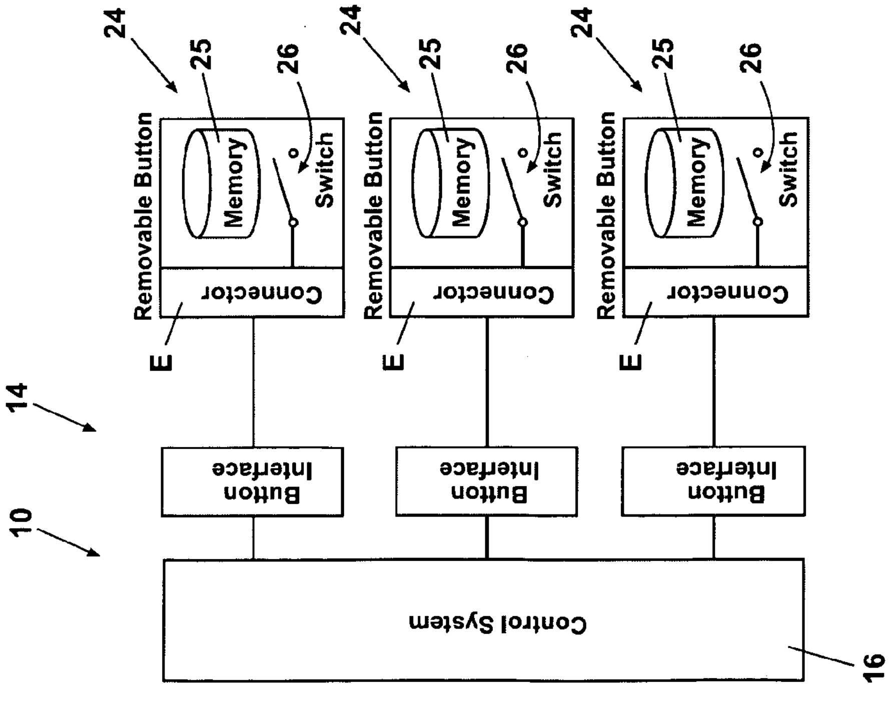
FIG. 3 is a schematic view of how the removable buttons interact with the control system of the oven.
Figure 4:
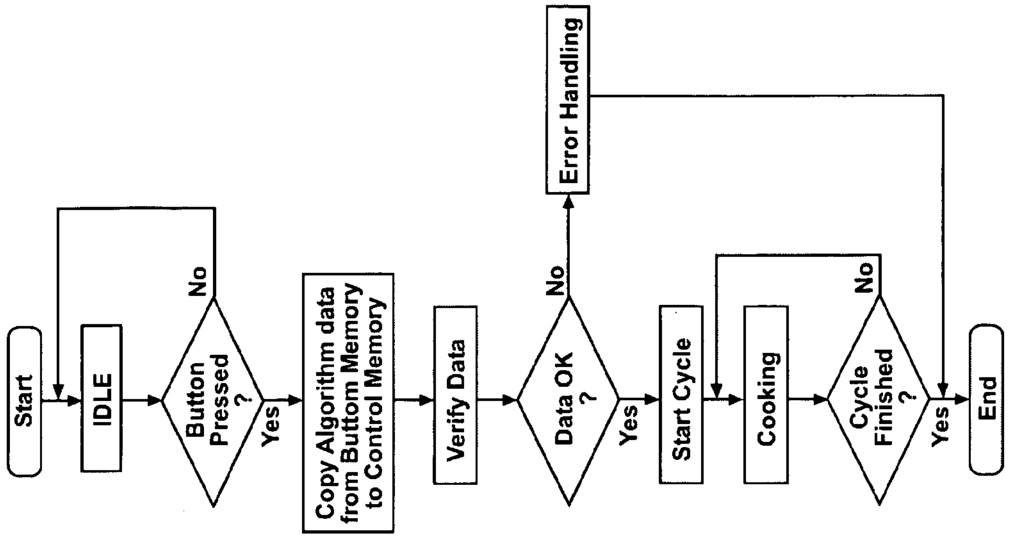
FIG. 4 is a flowchart showing how the microwave oven of FIG. 1 works.

With reference to FIG. 1, a microwave oven 10 has an oven cavity closed by a door 12 and user interface 14 connected to a control unit 16 of the oven (FIG. 3). The user interface 14 presents several buttons 18 for selecting the working parameters of the oven (temperature, power, function, time etc.).

According to the invention, the user interface 14 comprises at least one socket-shaped seat 22 adapted to receive a removable corresponding plug-shaped button 24 containing a solid state memory in which cooking/heating data related to a certain food are stored. Each removable button 24 comprises a stem portion 24*a* adapted to be inserted in the seat 22 and an enlarged portion 24*b* with a front face where an image D of the food is shown. Instead of an image D, a corresponding label can be used. The stem portion 24*a* of the removable button 24 comprises elastic fastening means for assuring a stable connection within the seat 22 and an easy removal of the button 24. Moreover each button 24 is provided with electrical connections E (FIG. 3) in order to provide an electrical link between the control unit 16 and a microprocessor 25 inside the removable button. A switch 26 (FIG. 3) may be associated within the removable button itself (as shown in FIG. 3) or it can be part of the mechanical connection of the removable button 24 and its seat 22.

In each removable button 24 there is therefore a combination of an image D of the food and of a memory 25 holding cooking data, which are automatically read by control unit 16 of the oven.

Each of the removable button 24, which has a picture of food associated with it, has therefore built in electronics that holds cycle data (time, power etc.) and works also as a switch for activation/start (one-touch button).

The oven control unit 16 reads cycle (algorithm) data from the button electronics and runs cooking and/or heating cycle when the button 24 is pressed. Of course the display of the oven can shows cycle data while the heating/cooking program is running.

The oven according to the invention has several advantages that go beyond the mere technical features. For instance, a food supplier can promote new products by shipping new food with removable buttons. At the same time one oven can cook food from different suppliers.

Due to the very simple approach to the user interface (one touch button), parent may prepare microwave oven with removable buttons that cook the food available in the freezer.

Another advantage is the possibility for the user to configure the oven interface with desired removable one-touch buttons 24.

The data format can be chosen according to the amount of data to be transferred to the control unit. Data size can be typically from 4 bytes/step to 6 bytes/step.

Additional data can be stored in the memory associated with each removable button, for instance text to be displayed on the user interface while cooking, sound files played in different stages of cooking (start, pause, finished).

Instead of a microprocessor, each removable button can store data in the form of electrical resistors where resistance represents food data (time, power etc.). According to this embodiment of the invention, the microwave oven control unit "reads" resistance with AC or DC current. Very cheap components can be used.

According to another embodiment of the invention, data are stored in EEPROM. This embodiment has a high flexibility, and it can be programmed late in production process. It is also possible to have the removable button as programmable by user.

According to a further embodiment of the invention, particularly for ovens having a menu based user interface, the button 24 holds link data that are interpreted by the control unit and bring up a predetermined menu. Therefore the user, by simply pressing once the button 24, can pull up a sub menu from a deeper level to a highest level. The user interface 14 becomes configurable, and the button 24 is not only used for starting the heating/cooking process but also for programming the oven. For example, if in a traditional oven the function "melt" can be accessed by selecting items in several menus until reaching it at level 6, by plugging in a button according to the present invention and labelled "melt", the user can access this menu item with only one press.

According to a further embodiment similar to the previous one, the button itself stores a menu not already stored in the control unit of the oven. In this case, by pressing the button 24 the user is immediately directed to a new sub-menu not existing in the oven. The button memory holds all necessary data that make possible for the control unit to enable the new menu and related features. The user can therefore add a new feature to the user interface, this latter becoming configurable as in the previous embodiment. In this case, if the oven does not have the function "melt" as a standard feature, by plugging in a plug-button 24 labelled "melt" the user can upgrade the oven with the "melt" feature.

I claim:

1. A cooking oven comprising:

means for detecting food data and for adjusting a food cooking process, a user interface with at least one socket-shaped seat adapted to receive a removable plug-shaped button, a plug-shaped button storing the food data and which is adapted to be inserted into the seat, means for programming the cooking oven when the button is inserted into the seat, and means for starting the cooking process upon subsequently pushing the button by a user.

2. The cooking oven according to claim 1, wherein the plug-shaped button includes a front face with an image or label indicative of the food associated thereto.

3. The cooking oven according to claim 1, wherein the plug-shaped button has a stem portion provided with means for electrically connecting with a control unit of the oven.

4. The cooking oven according claim 1, wherein the plug-shaped button has an embedded switch function.

5. The cooking oven according to claim 1, wherein the food data is stored in corresponding electrical resistances embedded in the plug-shaped button.

6. The cooking oven according to claim 1, wherein the food data is stored in EEPROM embedded in the plug-shaped button.

7. The cooking oven according to claim 1, wherein the user interface is menu based, and the removable plug-shaped button stores data adapted to bring up a menu on the user interface once the button is pressed.

8. The cooking oven according to claim 1, wherein the cooking oven constitutes a microwave oven.

9. A cooking oven comprising:

an oven cavity;

a door for selectively closing the oven cavity for a cooking operation;

a control unit for performing the cooking operation;

a user interface including a socket-shaped seat; and a removable plug-shaped button configured to be removably received in the socket-shaped seat, said removable plug-shaped button including memory having stored food data and being configured so that, upon fully inserting the removable plug shaped button in the socket-shaped seat and subsequently pressing the removable plug-shaped button, the control unit initiates the cooking operation based on the food data from the removable plug-shaped button.

10. The cooking oven according to claim 9, wherein the removable plug-shaped button includes electrical connections providing an electrical link to the control unit.

11. The cooking oven according to claim 9, wherein the food data of the removable plug-shaped button constitutes cooking data for a button specific food.

12. The cooking oven according to claim 9, wherein the food data includes cycle data for the cooking operation.

13. The cooking oven according to claim 12, wherein the cycle data includes at least time and power data.

14. The cooking oven according to claim 9, wherein the removable plug-shaped button includes a stem which is inserted into the socket-shaped seat.

15. The cooking oven according to claim 9, wherein the food data of the removable plug-shaped button constitutes program data for the cooking operation.

16. The cooking oven according to claim 9, wherein the removable plug-shaped button further includes a front face provided with an image or a label indicative of a particular food associated with the removable plug-shaped button.

17. The cooking oven according to claim 9, wherein the user interface is menu based and the removable plug-shaped button stores data configured to bring up a menu on the user interface once the removable plug-shaped button is pressed.

18. The cooking oven according to claim 9, wherein the cooking oven constitutes a microwave oven.

19. A method of operating a cooking oven with an oven cavity, a door for selectively closing the oven cavity for a cooking operation, a control unit for performing the cooking operation, a user interface including a socket-shaped seat, and a removable plug-shaped button including memory having stored food data, the method comprising inserting the removable plug-shaped button in the socket shaped seat, subsequently pressing the removable plug-shaped button, and in response to the pressing, initiating with the control unit the cooking operation based on the food data from the removable plug-shaped button.

20. The method according to claim 19 further comprising bringing up a menu on the user interface in response to pressing the removable plug-shaped button.

* * * * *